(12) United States Patent
Go et al.

(10) Patent No.: US 7,159,645 B1
(45) Date of Patent: Jan. 9, 2007

(54) LOW TORQUE INNER GIMBAL HEAT REMOVER

(75) Inventors: George Go, Orlando, FL (US); James R. Myers, Altamonte Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 155 days.

(21) Appl. No.: 10/859,270

(22) Filed: Jun. 1, 2004

(51) Int. Cl.
F28F 7/00 (2006.01)
F28F 9/26 (2006.01)
F28F 13/12 (2006.01)

(52) U.S. Cl. .................. 165/82; 165/104.34; 165/144; 285/41

(58) Field of Classification Search ............ 165/81–83, 165/80.3, 104.34, 122, 144–145; 361/690–691, 361/695; 285/41, 57
See application file for complete search history.

(56) References Cited

U.S. PATENT DOCUMENTS

| | | | | |
|---|---|---|---|---|
| 3,703,668 A | * | 11/1972 | Bylund et al. .............. | 257/714 |
| 3,904,163 A | * | 9/1975 | Kendy et al. ............... | 248/565 |
| 3,968,834 A | * | 7/1976 | Mangus et al. .............. | 165/82 |
| 4,428,025 A | | 1/1984 | King | |
| 4,561,040 A | * | 12/1985 | Eastman et al. ............ | 361/699 |
| 5,299,840 A | * | 4/1994 | Heye .......................... | 285/114 |
| 5,465,192 A | * | 11/1995 | Yoshikawa .................. | 361/705 |
| 5,497,825 A | * | 3/1996 | Yu ............................. | 165/11.1 |
| 5,917,697 A | * | 6/1999 | Wang ......................... | 361/695 |
| 6,056,018 A | | 5/2000 | Renaud | |
| 6,148,907 A | * | 11/2000 | Cheng ........................ | 165/121 |

* cited by examiner

*Primary Examiner*—Tho Duong
(74) *Attorney, Agent, or Firm*—Jeffrey D. Myers; Timothy D. Stanley; Peacock Myers, P.C.

(57) ABSTRACT

A cooling assembly for removing heat form an enclosed environment containing a gimbal device. The assembly comprises an exhaust bellows equipped with a device to draw heated air from the heat source to the outer environment an inlet bellows through which cool, outside air enters to displace the heated air.

9 Claims, 4 Drawing Sheets

LOW TORQUE INNER GIMBAL HEAT REMOVER

BACKGROUND OF THE INVENTION

1. Field of the Invention (Technical Field)

The present invention relates to methods and apparatuses for cooling an enclosed gimbal device.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Gimbal assemblies typically comprise a 3-axis assembly disposed within an outer 2-axis assembly to provide an overall 5-axis rotation. Such gimbal assemblies are commonly used to mount various technical devices, such as sensors, that must have freedom of movement in three dimensions. Some sensor gimbals, however, contain heat-generating devices, and current gimbal sensor designs are unable to efficiently remove heat generated from major sensor components. Sensor payloads generate substantial amounts of internal heat that must be removed; most known assemblies remove heat using liquid cooling, conduction, and air-to-air heat exchanger cooling systems, which are expensive, heavy and consume valuable payload space. Thus the cooling methods typically employed are not practical, especially with two relative moving bodies that require minimal torque disturbance to a precision inner gimbal assembly, especially under high vibration environment. Because the gimbal systems are extremely weight, space, and torque sensitive, the use of conventional heat reduction techniques are not practical.

Therefore, the problem is to design a method or apparatus for routing internally generated heat from the inner gimbal to the outer gimbal without compromising the system's performance and while maintaining a water-tight sensor payload. The design apparatus must be flexible and durable to meet requirements and to withstand harsh environments.

The present invention provides an efficient, lightweight, cost effective, less complex, and highly reliable solution to directly eliminate unwanted heat from a rotating precision sensor payload and transfer it to an external shroud without causing severe torque disturbances to the inner gimbal assembly.

BRIEF SUMMARY OF THE INVENTION

The present invention comprises an assembly for removing heat from an environment housing an inner gimbal. The assembly comprises an inlet bellows having and outer, open end opposite an inner, open end an exhaust bellows having an outer, open end opposite an inner, open end. The outer end of the inlet bellows is disposed to access cool ambient air, and the inner end attaches to a heat source. The outer end of the exhaust bellows is disposed to route the hot air into the outer ambient environment, and the inner end attaches to the heat source.

The bellows assembly further comprises a mechanism, such as a fan, disposed at the outer, open end of the exhaust bellows to draw heated air away from the heat source and draw cooler, outside ambient air through the inlet bellows.

Both bellows contain convolutes. The convolutes of the inlet bellows are oriented parallel to the axis of the open ends, and the convolutes of the exhaust bellows are oriented ninety degrees to the axis of the open ends.

Both bellows are made from a durable yet very flexible material; preferably, they are composed of Silastic E, a silicone based material manufactured by Dow Corning. The convolutes preferably are approximately 0.015–0.025 inches thick measured axially on the bellows, and the distance between peaks, which is substantially uniform, preferably is approximately 0.35–0.45 inches. In the preferred embodiment, the substantially uniform height of the convolutes, measured radially in relation to the bellows axis, is approximately 0.35–0.50 inches.

The present invention further comprises the method incorporating the cooling assembly.

A primary object of the present invention is to cool the environment within a gimbal assembly that houses an inner gimbal assembly.

A primary advantage of the present invention is that it provides an efficient, lightweight, cost effective, less complex, and highly reliable solution to directly eliminate unwanted heat without causing severe torque disturbances to the inner gimbal assembly.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The invention is a bellows apparatus for removing heat build-up in a gimbal device mounting heat-generating devices. The apparatus comprises an inlet bellows and an exhaust bellows. The bellows are free flexing and provide for very low torque to gimbal devices, which must have unimpeded gimbaled movement. Each bellows functions as an air duct and has a plurality of raised circumferential convolutes formed in the surface. One opening of the inlet bellows is attached to the outer shroud of the outer gimbal device, and the opening at the other end is attached to the heat source of the inner gimbal device. The exhaust bellows is likewise attached. An air movement means, such as a fan, preferably is disposed at the exit of the exhaust bellows to draw heated air away from the heat source to the environment outside the outer gimbal device. As air is drawn away from the heat source, cooler outside air is drawn through the inlet bellows to displace the heated air.

Figure 1A:
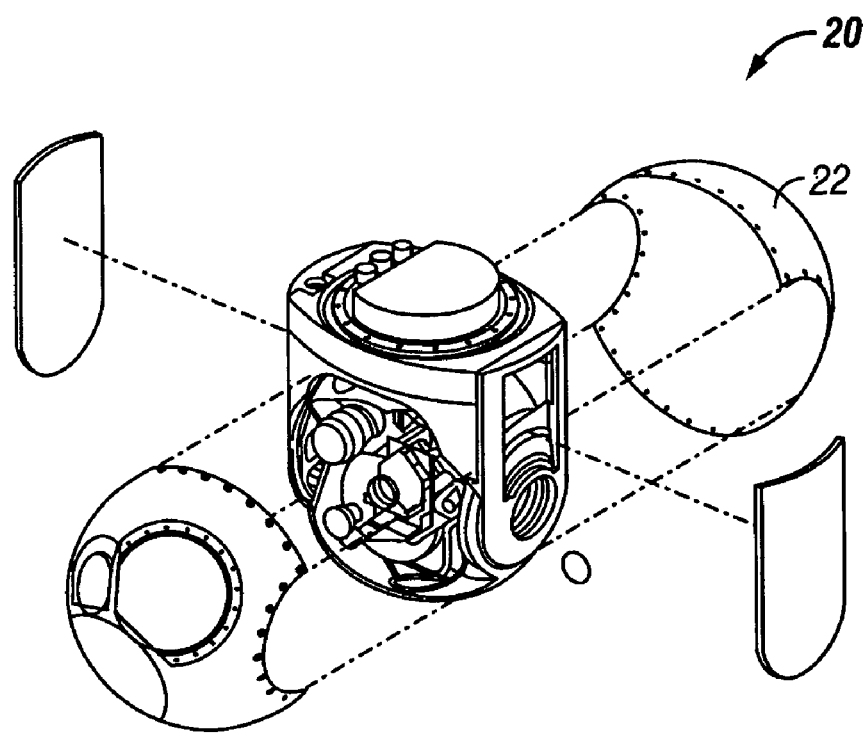
FIG. 1a is a perspective, partially exploded view of a 5-axis gimbal assembly with a sensor payload, in conjunction with which the present invention may be used.
Figure 1B:
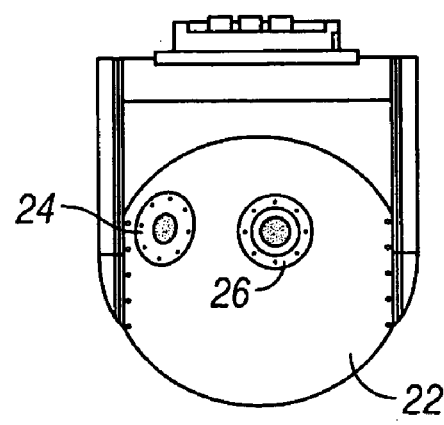
FIG. 1b is a side view of the gimbal showing the shroud with intake and exhaust vents for the bellows assembly.

Turning now to the figures, FIG. 1a shows a 5-axis gimbal assembly 20 demonstrating the location of the shroud 22. FIG. 1b shows the shroud 22 having an inlet vent 24 and an exhaust vent 26 therein, to which the inlet and exhaust bellows are connected, respectively.

Figure 2:
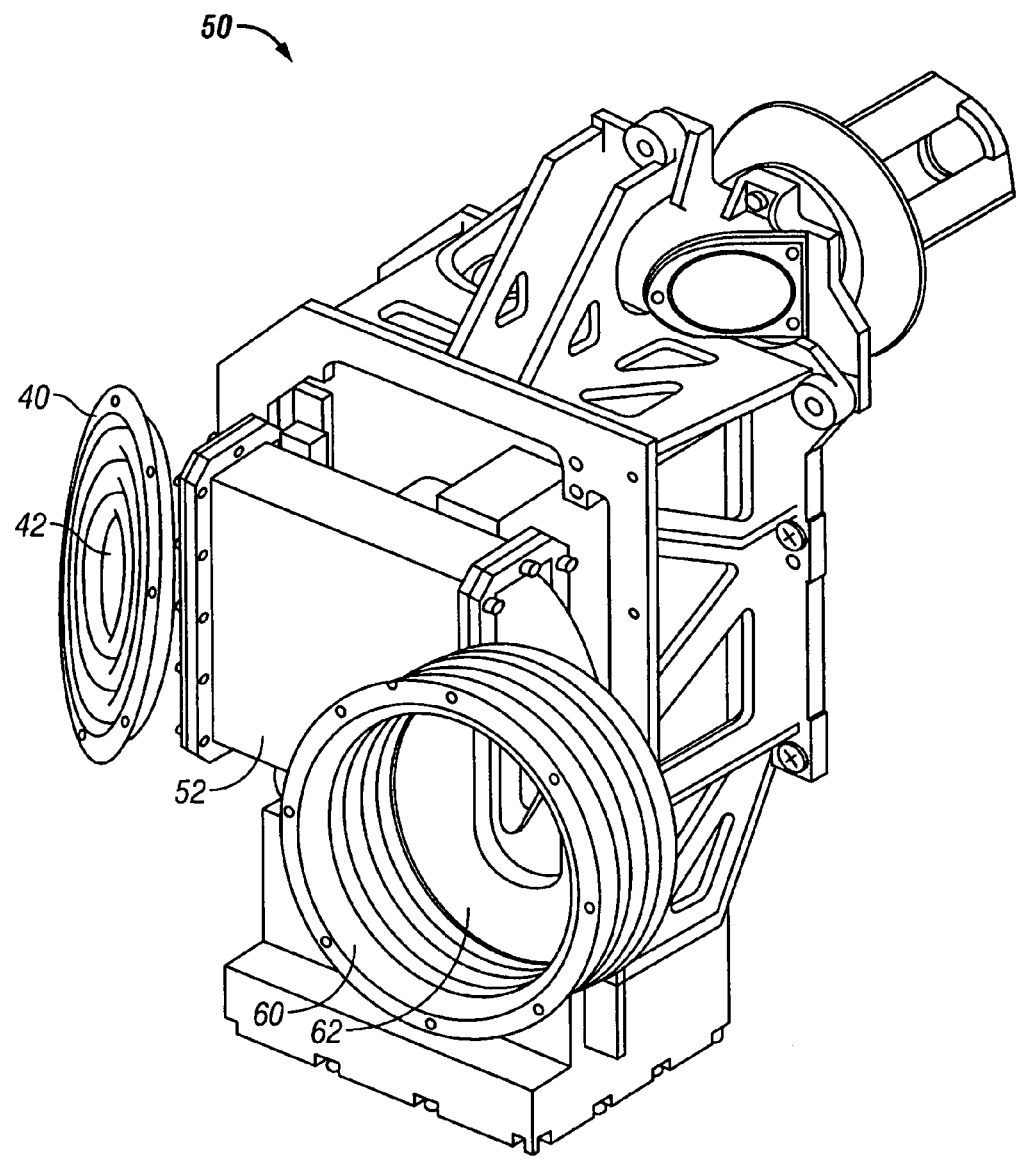
FIG. 2 is a perspective view of the bellows assembly attached to the heat source of an inner gimbal device.

In FIG. 2, both the inlet bellows 40 and the exhaust bellows 60 are shown attached to the heat source 52 of the inner gimbal device 50. The inlet bellows 40 features an outer opening 42 by which the inlet bellows 40 attaches to the shroud 22. The inner opening 44 of the inlet bellows 40 attaches to the heat source 52 of the inner gimbal device 56. The exhaust bellows 60 likewise has an outer opening 62 by which the exhaust bellows 60 attaches to the shroud 22. The inner opening 64 of the exhaust bellows 60 attaches to the heat source 22 of the inner gimbal device 50.

All openings 42, 44, 62, 64 of both bellows 40, 60 attach to the shroud 22 and the heat source 52 via adhesives, mechanical fasteners, retainers, or any other means so that the attachments are secured and sealed to be substantially air tight.

Figure 3A:
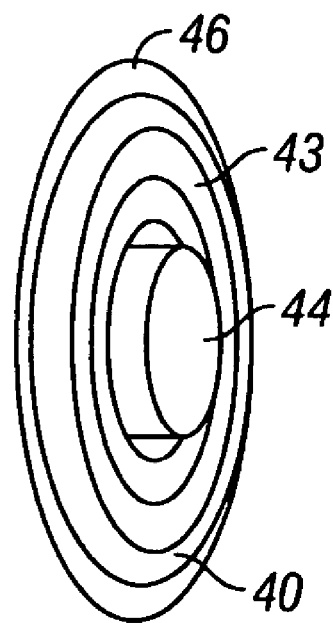
FIG. 3a is a perspective view of the inlet bellows.

Shown in FIG. 3a is the inlet bellows 40 with convolutes 43 defined therein. To facilitate a "joystick" movement, the inner opening 44 of the inlet bellows is attached to a plenum 45 having a rectangular end that in turn attaches to the heat source 52. The outer opening 48 of the inlet bellows 40 is attached to the shroud 22.

Figure 3B:
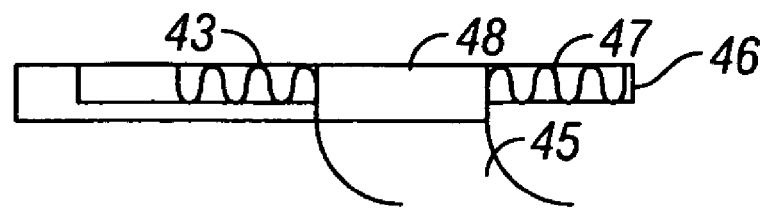
FIG. 3b is a side partial sectional view of the convolutes of the inlet bellows.

A detailed view of the convolutes 43 of the inlet bellows 40 is shown In FIG. 3b. The convolutes 42 preferably are mutually parallel to and coaxial with the axis defined by the openings 44, 48 of the inlet bellows 40. The convolutes 43 are between approximately 0.015–0.025 inches thick, preferably approximately 0.020 inches thick. The distance between the linear sides 47 of each convolute 43 preferably is approximately 0.25 inches. The height of the peak of each convolute 43 is preferably approximately 0.4 inches. The radius of the turn of each convolute 43 is preferably approximately 0.115 inches. The flange 46 seen in FIG. 3b preferably is approximately 0.6 inches thick.

Figure 4A:
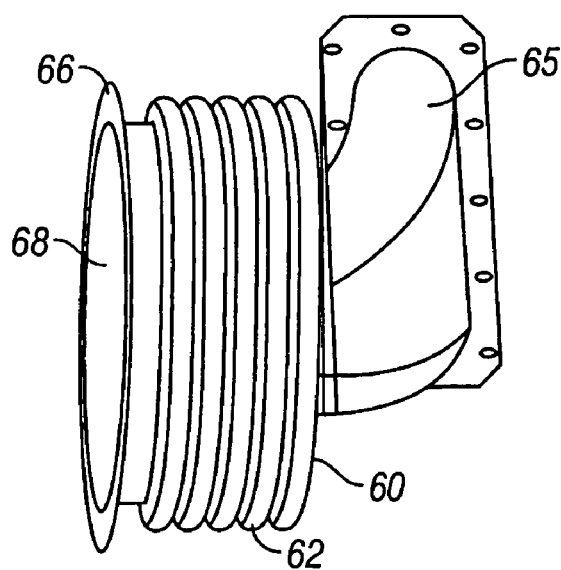
FIG. 4a is a perspective view of the exhaust bellows.

Shown in FIG. 4a is the exhaust bellows 60 which is attached from its inner opening 64 to an elbow plenum 65 with a preferably rectangular end that attaches to the same heat source 52 to which the inlet bellows 40 attaches. The outer end opening 68 of the exhaust bellows 60 attaches to the shroud 22.

Figure 4B:
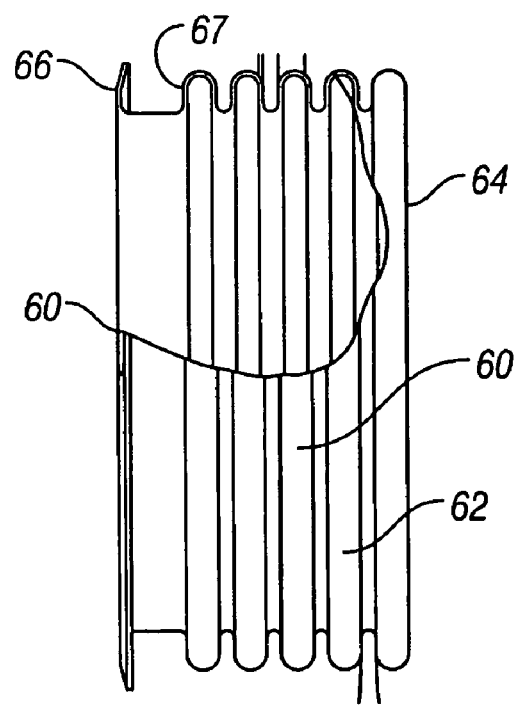
FIG. 4b is a side view of the convolutes of the exhaust bellows.

In FIG. 4b are shown the convolutes 62 of the exhaust bellows 60. The convolutes 62 are preferably oriented at ninety degrees to the axis of the openings 64, 68 of the exhaust bellows 60. The convolutes 62 are between approximately 0.015–0.025 inches thick, preferably approximately 0.020 inches thick. The distance between each linear side 67 of each convolute 62 joined by a turn oriented toward the outside of the exhaust bellows 60 is preferably approximately 0.336 inches and the distance between each linear side 67 of each convolute 62 joined by a turn oriented toward the inside of the exhaust bellows 62 is preferably approximately 0.319 inches. The height of the peak of each convolute 62 is preferably approximately 0.45 inches. The radius of the turn of each convolute 62 oriented toward the outside of the exhaust bellows 60 is approximately 0.115 inches, and the radius of the turn of each convolute 62 oriented toward the inside of the exhaust bellows 60 is approximately 0.085 inches.

The mounting flanges 46, 66 of both bellows are approximately 0.09 to 0.10 inches thick, preferably approximately 0.09 inches thick.

An air mover (not depicted in the figures), such as a fan, may be disposed anywhere along the path through which air about the bellows 40, 60 to aid in the displacement of air so that the heated air is removed more efficiently away from the heat source 22. Such a device is preferably disposed at the outer end opening 68 of the exhaust bellows 60 at, or near, the exhaust vent 26 to generate negative pressure to pull unwanted heated air out through the exhaust bellows 60 into the ambient air and allow cool ambient air to enter through the inlet bellows 40 and travel about the heat source 22. With this design, the traveling air will not contaminate the internal air.

The orientation of the convolutes 42, 62 described above is the orientation for the preferred embodiment. However, the convolutes 42, 62 may be oriented in a variety of ways as appropriate to the particular application. The height and thickness of the convolutes 45, 62 and the distance between the peaks of the convolutes 42, 62 described above are also for the preferred embodiment, but may vary as required for any given application. Both bellows 40, 60 discussed for the preferred embodiment are circumferential or round but may be of any shape such as rectangular, round, triangular, etc. depending on their application.

The body comprising the convolutes 42, 62 of both bellows 40, 60 may be made of any flexible material. However, in the preferred embodiment they are made of a silicone-based material such as Silastic® E, a product of Dow Corning. The convolute portion of the bellows 42, 62 may be made by any conventional means known to those skilled in the art, but are preferably manufactured by spraying a silicon-based material onto a smooth male mold using a rotating table until the desired material thickness is achieved. The flanges 46, 66 may be made of any rigid material, preferably silicone rubber coated on Knit Nomex® (a meta-aramid fiber by DuPont). The plenums 45, 65 may be made of any rigid material, preferably of silicone rubber coated on woven fiberglass, preferably Electro Guard 2100.

Torque on the payload is minimized because of the bellows' 40, 60 unique geometry, thickness, material composition, and orientation. The design of the bellows 40, 60 (geometry, thickness, material, and orientation) takes into account the space constraints, the angles of motion of a gimbal, and the mounting interfaces to minimize torque disturbances. For both bellows 40, 60, inner gimbal torque consumption averages less than 10% in pitch, yaw, and roll. Together with the design geometry, the use of silicone rubber as the material of choice offers a very durable yet flexible apparatus.

Most or all gimbal sensor payloads are weight and space critical. The design of the present invention provides an efficient, simpler, more reliable method for removing heat, at the source, from the inner gimbal assembly with minimal cost, less weight (through parts reduction), and no negative impact on hardware. Therefore, the present invention will be of interest to any company that designs and produces a multi-axis gimbal system that incorporates sensor payloads.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for removing heat from an environment housing a gimbal device, comprising:
    a shroud;
    an inner gimbal having a heat source, said inner gimbal disposed within said shroud;
    an inlet bellows comprising a flexible material and having an outer open end connected to an intake vent of said shroud to access an outer ambient air environment and an inner open end connected to said heat source; and
    an exhaust bellows comprising a flexible material and having an outer open end connected to an exhaust vent of said shroud to access the outer ambient air environment and an inner open end connected to said heat source; and
    wherein said inner gimbal rotates in said shroud with minimal torque interference from said inlet bellows and said exhaust bellows.

2. The apparatus of claim 1 wherein said inlet bellows and said exhaust bellows define convolutes therein.

3. The apparatus of claim 2 wherein said convolutes of said inlet bellows are oriented parallel to the axis of said outer open end and said inner open end, and wherein said convolutes of said exhaust bellows are oriented substantially perpendicular to the axis of said outer open end and said inner open end.

4. The apparatus of claim 2 wherein said convolutes of said inlet bellows and said exhaust bellows are approximately 0.015–0.025 inches thick.

5. The apparatus of claim 2 wherein a distance between the peaks of said convolutes is approximately 0.35–0.45 inches.

6. The apparatus of claim 2 wherein a height of the convolutes is approximately 0.35–0.50 inches.

7. The apparatus of claim 1 wherein said inlet bellows and said exhaust bellows comprise a silicone-based material.

8. The apparatus of claim 7 wherein said inlet bellows and said exhaust bellows comprise a silicone-based rubber.

9. A method of cooling an environment housing a gimbal device comprising the steps of:
    disposing within a shroud an inner gimbal having a heat source;
    connecting an outer open end of an inlet bellows comprising a flexible material to an intake vent of the shroud to access an outer ambient air environment and connecting an inner open end of the inlet bellows to the heat source; and
    connecting an outer open end of an exhaust bellows comprising a flexible material to an exhaust vent of the shroud to access the outer ambient air environment and connecting an inner open end to the heat source; and
    rotating the inner gimbal within the shroud with minimal torque interference from the inlet bellows and the exhaust bellows.

* * * * *